Oct. 8, 1935.  F. T. MORRIS  2,016,834
PHOTOFLASH DEVICE
Filed Oct. 19, 1932  2 Sheets-Sheet 1
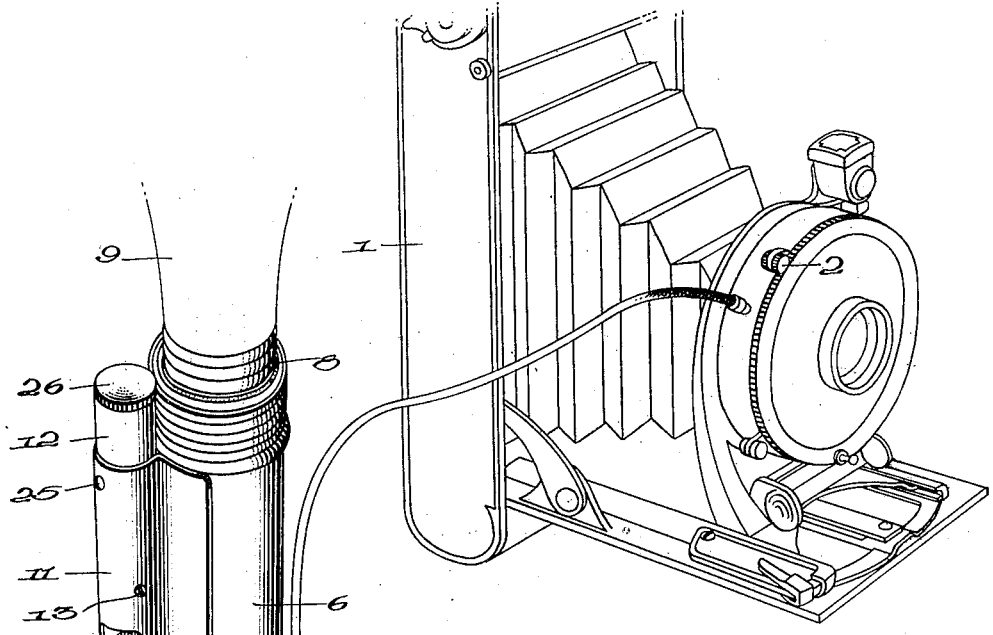

Oct. 8, 1935.  F. T. MORRIS  2,016,834
PHOTOFLASH DEVICE
Filed Oct. 19, 1932  2 Sheets-Sheet 2
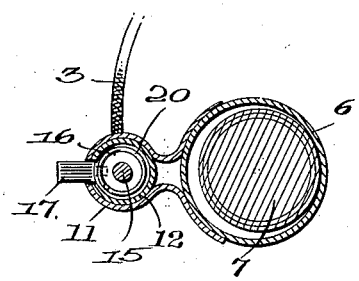
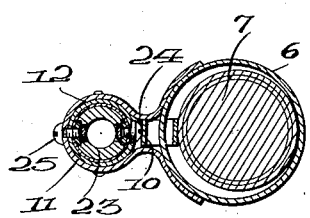
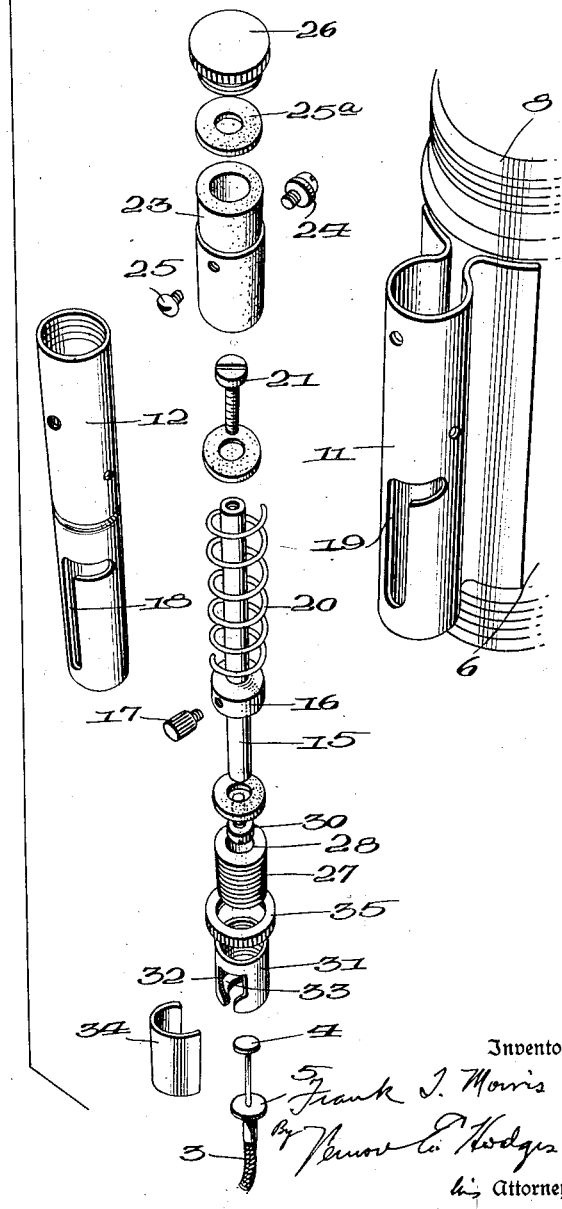
Inventor
Frank T. Morris
By Vernon E. Hodges
his Attorney Patented Oct. 8, 1935

2,016,834

UNITED STATES PATENT OFFICE 2,016,834

PHOTOFLASH DEVICE

Frank T. Morris, New York, N. Y., assignor to Clarence L. Beaty, New York, N. Y.

Application October 19, 1932, Serial No. 638,624

16 Claims. (Cl. 67—29)

This invention relates to the synchronizing of photographic flash-light with the actuation of the camera shutter, so that the exposure is simultaneous with the illumination by the photo-flash bulb.

Heretofore no practical means has been used whereby the flash-light illumination is simultaneous with the exposure, and it has been necessary either for one operator to cause the illumination and another to control the camera shutter or for the one operator to use his separate hands for the two operations. In either event, it is almost impossible to obtain true synchronizing between the actions of exposing the film in the camera and the illumination by the flash-light which is essential to the successful taking of a picture.

My present invention has provision for simultaneously causing the flash-light illumination and the operation of the camera shutter so that there is no variation between the two, such as would interfere with the taking of a clear picture.

I utilize a spring-pressed plunger, one end portion of which controls the illumination by the flashing bulb, while the other end portion controls the actuation of the camera shutter by the usual shutter operator. The one plunger, controlling both of those elements, causes the simultaneous exposing of the film in the camera and the illumination of the object by the flash-light bulb. Provision is made for setting the plunger so that it will be held in such a position as to be instantaneously released and moved by the action of the spring to effect the double operation. Provision is also made for adjusting the connection with the shutter actuator to accommodate the device to different lengths as may be desirable.

In the accompanying drawings,

Fig. 1 is a perspective view of my invention shown connected with a conventional form of camera;

Fig. 2 is a longitudinal sectional view through my synchronizing device;

Fig. 3 is a transverse, sectional view therethrough on the line, 3—3, of Fig 2;

Fig. 4 is a similar view on the line 4—4, of Fig. 2;

Fig. 5 is a similar view on the line 5—5, of Fig. 2, and;

Fig. 6 is a disassembled perspective view of the principal parts of my invention.

I have illustrated in Fig. 1, a conventional form of camera of well-known construction, merely to show the manner of operating my invention, but it is not limited to the kind of camera therein shown. The camera is designated generally by the numeral 1, and is provided with the usual setting arm 2 designated to set the shutter for an exposure. The shutter is usually operated or released by means of a release cable 3 which is in the form of a Bowden tube having a small Bowden wire extending therethrough designed for longitudinal movement by pressure applied to the head 4, at the end of the Bowden wire. The end of the release cable 3 is provided with a collar 5 by which it may be grasped in order to depress the head 4 to manipulate the shutter.

I have shown my invention applied to a flash-light casing 6 enclosing a flash-light battery 7 and the casing has a socket 8 into which may be screwed a photographic flash-light bulb 9, of a character well-known in the art and designed to cause a brilliant illumination when the bulb is ignited or energized by electric current from the battery 7. One side of the battery 7 is grounded to its casing, while the other side thereof is connected with one of the terminals of the lamp 9, the other terminal forming a connection with the socket 8. The latter has a contact member 10 attached thereto and extending laterally through a side of the casing 6 in the manner shown in Fig. 2.

Attached to the casing 6 is a tubular support 11, the sides of which are shown as slightly embracing the casing in order to form a rigid connection therebetween. A tube 12 extends through the tubular support 11, and is held in place by means of screws 13 which extend through the support 11 and into the tube 12 for maintaining the same in proper assembled relation. The tube 12 has a guide 14 fixed therein, and slidably mounted through this guide 14 is a plunger or stem 15. The plunger 15 has a collar 16 fixed thereon intermediate its ends, and threaded into the collar 16 is a pin 17 which extends laterally through L-shaped slots 18 and 19 in the tube 12 and the tubular support 11, respectively, for manipulation by the operator.

A coil spring 20 is sleeved over the upper end portion of the plunger 15 and is interposed between the collar 16 and the guide 14, so as to normally tend to force the plunger downward in the tube 12.

The upper end of the plunger 15 has a screw 21 threaded thereinto for adjustment relative to the end of the plunger, and the head of the screw is sufficiently large to bridge sliding spring contacts 22, which are disposed within the tube 12 on opposite sides of the head of the screw 21. The contacts 22 are normally insulated from each other, being carried by a bushing 23 of insulating material such as bakelite, celluloid, or the like, and screws 24 and 25 are threaded into the bushing in position to engage the contacts 22, the screw 24 projecting through a side of the tube 12 in position to engage the contact member 10 and the screw 25 grounds the other contact 22 to the support 11, and thereby connects it with the casing 6 which encloses the battery and is connected with one side of the battery. The construction of these parts from a material which acts as a suitable conductor of electric current, such for instance as brass, forms an electrical connection between one side of the battery and one of the contacts 22, the other contact being electrically connected through the contact 10, the socket 8, and the lamp 9 with the other side of the battery.

The contacts 22 being normally insulated from each other and spaced apart are only connected when the head of the screw 21 bridges those contacts which thereby closes the circuit through the battery and lamp. The head of the screw 21 has sliding contact with the contacts 22, but when the plunger is pushed up and the pin 17 locked in the short arms of the L-shaped slots 18 and 19, the head of the screw 21 is disposed within the bushing 23 out of contact with the contacts 22 and the circuit through the lamp is broken. A portion of the bushing 23 extends downwardly within the tube 12 around the contacts 22, completely insulating said contacts from the sides of the tube. An insulating washer 25a is arranged at the end of the bushing 23 in position to be engaged by the head of the screw 21 to limit the extreme upward movement thereof, and a plug 26 is screwed into the end of the tube 12 against the washer 25a to close said tube.

A bushing 27 is adjustably threaded into the lower end of the tube 12 and this bushing 27 has an internal opening 28 of a larger diameter than the diameter of the plunger 15, so as to be spaced therefrom, the lower end of said opening being flared as at 29 to receive the head 4 of the shutter actuator and to center said head 4 in position for engagement by the head of a screw 30 adjustably threaded into the lower end of the plunger 15.

A coupling 31 is threaded onto the end of the bushing 27 for adjustment relative thereto and has a notch 32 in a side thereof through which the head 4 and collar 5 of the shutter actuator may be inserted and the collar 5 is then drawn down against a seat 33 formed in the end of the coupling 31 where said collar is held in place with the head 4 projecting toward the end of the plunger 15 in position to be engaged by the head of the screw 30. A shield 34 surrounds the coupling 31 to close the notch 32 after the parts are in place to prevent displacement thereof. A lock nut 35 is threaded onto the bushing 27 to lock the coupling in place relative to the end of the plunger 15.

In using the invention for synchronizing the exposure with the illumination of the object, the end portion of the shutter actuator is inserted into the coupling 31 with the collar 5 resting on the seat 33 and the head 4 projecting upwardly in the flared portion 29 of the opening in the bushing 27 in position to be engaged by the head of the screw 30. The plunger 15 is pushed up by the pin 17 and is locked by the engagement of the pin in the short arm of the L-shaped slots 18 and 19, which movement breaks the connection between the contacts 22 by removing the head of the screw 21 from bridging relation between said contacts.

A lamp is inserted into the socket 8 and the camera is set for the desired exposure. It is then only necessary to push the pin 17 out of the short arms of the L-shaped slots 18 and 19 and the spring 20 bearing on the collar 16 of the plunger 15 forces the plunger downward causing the head of the screw 30 to depress the head 4 of the camera actuator sufficiently far to actuate the shutter and simultaneously therewith moves the head of the screw 21 into bridging relation between the contacts 22 closing the circuit through the lamp 9 and causing the illumination of the object which illumination is simultaneous with the exposure. The screws 21 and 30 are adjustable in the ends of the plunger 15, so as to obtain proper synchronization between the closing of the circuit through the lamp and the actuation of the shutter of the camera. The adjustment of the bushing 27 and the coupling 31 thereon is such that as to accommodate for different kinds of actuators and the difference between the movement of the Bowden wires thereof.

I claim:

1. A photographic flash light device comprising a tubular casing, a coupling having screw-threaded connection therewith for adjustment lengthwise of the casing and having a seat, a plunger slidably mounted in the casing and having an end portion co-operating with the seat, resilient means acting on the plunger, spaced contacts mounted in the casing, and means carried by the plunger in position to bridge the contacts upon movement of the plunger toward the seat.

2. A photographic flash light device comprising a tubular casing, a coupling having screw-threaded connection therewith for adjustment lengthwise of the casing and having a seat, a plunger slidably mounted in the casing and having an end portion co-operating with the seat, resilient means acting on the plunger, spaced contacts mounted in the casing, means carried by the plunger in position to bridge the contacts upon movement of the plunger toward the seat, and means for adjusting said bridging means longitudinally of the plunger to co-operate with an adjustment of the seat relative to the plunger.

3. A photographic flash light device comprising a tubular casing, a plunger mounted therein, resilient means acting on the plunger to move the same in one direction, spaced contacts mounted in the casing, means carried by an end portion of the plunger in position to bridge the contacts upon movement of the plunger in one direction in response to the resilient means, and means for holding the plunger in a retracted position, said bridging means being disposed relative to the plunger so as to be out of bridging relation with the contacts when the plunger is in a retracted position.

4. A photographic flash light device comprising a tubular casing, a bushing at an end portion thereof provided with an opening therein in position to receive an end portion of a shutter actuating cable, a spring-pressed plunger mounted in the casing and extending through the bushing in position to actuate the cable, and a seat carried by the tubular casing for holding said end portion of the cable.

5. A photographic flash light device comprising a tubular casing, a bushing arranged at an end portion thereof and having a flared opening therein in position to receive an end portion of a shutter actuating cable, a spring-pressed plunger mounted in the casing and extending through the bushing in position to actuate the cable, and a seat for holding an end portion of he cable, said seat having a screw-threaded connection with the bushing.

6. A photographic flash light device comprising a tubular casing, a bushing screw-threaded into an end portion thereof, said bushing having an opening therethrough with a flared end portion in position to receive an end portion of a camera actuating cable, a spring-pressed plunger slidably mounted in the casing in position to engage the end of the cable, a coupling having screw-threaded connection with the bushing and having a seat for the cable, and means for preventing displacement of the cable from the seat.

7. A photographic flash light device comprising a tubular casing having a bushing arranged at an end thereof, a coupling having screw-threaded connection with said bushing and provided with a seat for receiving an end portion of a shutter actuating cable, a plunger slidably mounted in the casing in position to operate the cable, a spring acting on the plunger tending to move the same in one direction, and means for holding the plunger in a retracted position.

8. A photographic flash light device comprising a tubular casing having a bushing arranged at an end thereof, a coupling having screw-threaded connection with said bushing and provided wtih a seat for receiving an end portion of a shutter actuating cable, a plunger slidably mounted in the casing in position to operate the cable, a spring acting on the plunger tending to move the same in one direction, means for holding the plunger in a retracted position, spaced contacts mounted in the casing and insulated from each other, and means carried by the plunger for bridging the contacts, said means being arranged relative to the plunger as to be spaced from the contacts when the plunger is in a retracted position.

9. In a photographic flash-light device, a casing, a bushing at an end portion thereof, a spring-pressed plunger slidable through the bushing, and a coupling having screw-threaded connection with the bushing and being adjustable lengthwise relative thereto, said coupling having a seat to receive an end portion of a shutter-actuating cable.

10. In a photographic flash-light device, a casing, a bushing adjustably screwed onto an end portion of the casing, a lock-nut screwed on the bushing against the end of the casing, a spring-pressed plunger slidable through the bushing, and a coupling adjustably screwed onto the bushing and being adjustable lengthwise relative thereto, said coupling having a seat to receive an end portion of a shutter actuating cable.

11. In a photographic flash-light device, a casing, means at an end portion of said casing for receiving an end portion of a shutter actuating cable, circuit closing means arranged at the opposite end portion of said casing, and a spring-pressed plunger slidably mounted in the casing and having means at one end thereof for actuating the cable, and having means at the other end portion thereof for controlling the circuit closing means.

12. In a photographic flash-light device, a casing, means at an end portion of said casing for receiving an end portion of a shutter actuating cable, circuit closing means arranged at the opposite end portion of said casing, and a spring-pressed plunger slidably mounted in the casing and having means at one end thereof for actuating the cable, and having means at the other end portion thereof for controlling the circuit closing means, said cable actuating means and circuit closing means being adjustable lengthwise of the plunger to coordinate the timed relation thereof.

13. In a photographic flash-light device, a casing, means at an end portion of said casing for receiving an end portion of a shutter actuating cable, spaced contacts arranged at the opposite end portion of said casing, and a spring-pressed plunger slidably mounted in the casing and having a head at the first-mentioned end portion for actuating the cable, and having a head at the other end portion thereof in position to bridge the contacts.

14. In a photographic flash-light device, a casing, means at an end portion of said casing for receiving an end portion of a shutter actuating cable, spaced contacts arranged at the opposite end portion of said casing, and a spring-pressed plunger slidably mounted in the casing and having a head at the first-mentioned end portion for depressing the cable, and having a head at the other end portion thereof in position to bridge the contacts, said heads having screw-threaded connection with opposite ends of the plunger and being adjustable lengthwise relative thereto.

15. In apparatus of the kind described, a tubular member, a spring pressed plunger located in the tubular member, movable mechanism positioned inside the tubular member and adapted to be actuated by the movement of the plunger, and adjustable means mounted inside the tubular member and interposed between the plunger and the mechanism for varying the time of commencement of the operation of the mechanism by the plunger with respect to the initial movement of the said plunger.

16. In apparatus of the kind described, a tubular member having a spring pressed plunger therein, means for releasably holding the plunger in a cocked position with its spring contracted, adjustable means located in the tubular member and at one end of the plunger which is capable of being lengthened or shortened with reference to the said end of the plunger, and movable mechanism extending into the tubular member and adapted to be struck by the means on the end of the plunger when the said plunger is released from a cocked position and is actuated by the spring.

FRANK T. MORRIS.